May 25, 1971 L. Z. SHENFIL ET AL 3,580,776

METHOD OF PRODUCING ELECTRIC CONTACT BETWEEN TWO CEMENTED PARTS

Filed June 9, 1967

United States Patent Office 3,580,776
Patented May 25, 1971

3,580,776
METHOD OF PRODUCING ELECTRIC CONTACT BETWEEN TWO CEMENTED PARTS

Leonid Zalmanovich Shenfil, 1 Cherkivovskaya yl. 60, kv. 3; Valentin Evgenievich Gul, Zelenodolskaya 33, korp. 1, kv. 10; Galina Konstantinovna Melnikova, 1 Basmanny per. 12, kv. 23; Nina Isidorovna Siprikova, B. Zjuzinskaya ul. 10, korp 12, kv. 22; Maiya Konstantinovna Rozhdestvenskaya, Lenisky prosp. 101, korp. 179, kv. 22; and Alexandr Nikitichna Kuzina, N. Khoroskevskoe shoss 18, korp. 4, kv. 8, all of Moscow, U.S.S.R.

Filed June 9, 1967, Ser. No. 645,038
Int. Cl. B29c *19/06*
U.S. Cl. 156—275 7 Claims

ABSTRACT OF THE DISCLOSURE

A method is provided for producing an electric contact by means of a current-conducting cement constituted as a hardening epoxy resin containing a current-conducting ferrogmagnetic filler. The cement film is hardened in a non-uniform magnetic field having a variable intensity across the field section, and initially a pulsating magnetic field is applied having a frequency of 0.1 to 1000 c.p.s. when the static component of magnetic induction has a value of 50 to 15,000 gausses and when the amplitude is within the range of 10 to 5000 gausses.

The present invention relates to methods of producing an electric contact.

The known method of wiring in microelectronics consists in the use of current-conducting cements based on hardening polymer resins containing large amounts of powdered silver or gold.

However, this wiring technique possesses a number of serious disadvantages, in particular it fails to provide a low contact resistance in the bonding of such materials as indium, gold, Ferico, brass, etc. Moreover, this method does not produce a multipoint contact with a high density of contacts per unit area.

An object of the present invention is to eliminate the aforementioned disadvantages.

Another object of the invention is to provide a method of producing an electric contact possessing a low contact resistance and a high density of contacts per unit area.

This object is carried into effect by using a ferromagnetic powder as a filler and by processing the cement film in a nonuniform magnetic field characterized by a variable intensity across the field section.

The preliminary treatment of the cement film is carried out mostly in a pulsating magnetic field.

It is practicable to use nickel powder as a filler.

The invention will now be described by way of example with reference to the accompanying drawings in which.

Figure 1:
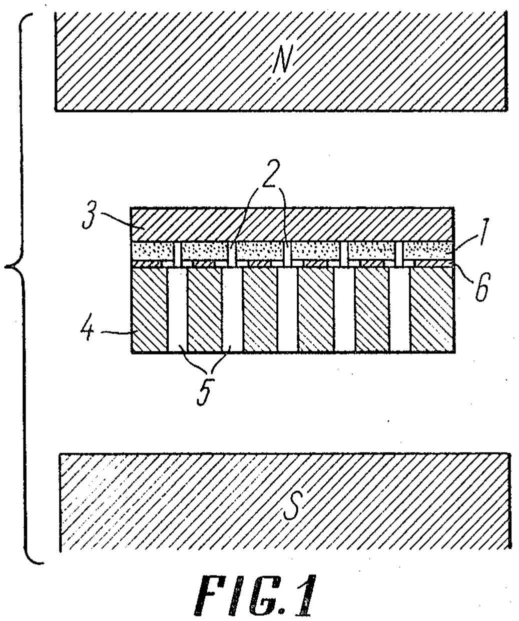
FIG. 1 illustrates diagrammatically the cement contact between a semiconductor plate and a reinforced glass disc according to the invention.

The contact resistance of the cemented joint produced by the use of a current-conducting polymer cement is materially reduced if the polymer cement film 1 (FIG. 1) is hardened in a magnetic field. The effect of the magnetic field on the electric resistance of the cemented joint is not intense unless the current-carrying filler possesses ferrogmagnetic properties.

Upon application of a magnetic field, beams 2 consisting of the particles of the current-carrying filler are induced in the non-hardened cement film 1, these beams being oriented in the direction of the field.

The cement film 1 processed in the magnetic field has a resistance anisotropy whose magnitude can be expressed by the coefficient of anisotropy $$K=\rho_2/\rho_1$$

where

K=coefficient of anisotropy,
$\rho_1$=specific resistance in the direction of orientation,
$\rho_2$=specific resistance in the direction perpendicular to the direction of orientation.

The method of the invention allows obtaining a polymer film 1 whose value of K varies from 1 to $10^{16}$.

Each current-conducting meam 2 oriented perpendicular to the plane of the cemented joint forms a microcontact between the cemented parts 3 and 4 in the anisotropic cement film 1. The number of microcontacts on an area of 1 cm.$^2$ can be varied from 5 to 10,000. The number of microcontacts depends upon the type of the magnetic field applied, upon the thickness of the cement film 1, and upon the size and shape of the particles of the current-conducting filler.

When the cement film 1 is hardened in a uniform magnetic field a high coefficient of anisotropy can be obtained only with a small content of the current-carrying filler, not exceeding 3–4 percent by volume. In this case the number of microcontacts is practically difficult to control, they are scattered irregularly and their electric resistance is very high.

As the amount of the current-carrying filler grows and reaches a certain limit, the value of K drops sharply.

According to the invention, the desired number of microcontacts with a low electric resistance can be produced by using a nonuniform magnetic field of a variable intensity across its section. The number and pattern of the current-conducting beams 2 of particles in the nonuniform magnetic field is determined by the number of areas of higher magnetic intensity across the section of the field.

The nonuniform magnetic field is produced mostly by conductors 5 made of ferromagnetic materials, which are an integral part of at least one of the cemented parts 3 or 4.

Being oriented with their larger axis along the direction of induction of the magnetic field, formed by an electromagnet of a corresponding type, said conductors 5 create a higher intensity of magnetic field along the continuation of the larger axis and in immediate proximity to it; into this field are pulled the particles of the current-conducting ferrogmagnetic filler, constituting compact conductive beams 2.

An increase in the amount of the current-conducting filler in the cement film 1 hardened in a nonuniform magnetic field does not increase the number of microcontacts but reduces the resistance of each microcontact while retaining their initial pattern and number.

The maximum proportion of the current-conducting filler in the film 1 hardened in a nonuniform magnetic field exceeds that in the film hardened in a uniform field by 3 to 5 times while the total contact resistance of the cemented joint on an area of 1 cm.$^2$ decreases 2 to 4 times with such an increase in the amount of the filler.

The contact resistance of the cemented joint can be substantially reduced and more reproducible results can be obtained by the use of a pulsating magnetic field at the first stage of the contact-forming process; this pulsating field should have a frequency of from 0.1 to 1000 c.p.s., the static component of induction being from 50 to 15,000 gauss and the amplitude from 10 to 5000 gauss.

After the treatment in the pulsating magnetic field and before its final hardening, the cement film 1 should be held in a static magnetic field whose induction should be not lower than the residual induction of the current-conducting filler.

As shown in FIG. 1, the semiconductor plate 3 is cemented to the reinforced glass disc 4 having 930 Fernico conductors 5 per 1 cm.$^2$. The surface of the glass disc between the conductors 5 is spray-coated in vacuo to form a platinum balancing grid 6 which is insulated from the Fernico conductors 5.

As an example, the following composition of cement is given, in percent of hardenable epoxy resin FD–5 (a product of condensation of epichlorohydrin and diphenylolpropane) containing 21% of epoxy groups.

| | |
|---|---|
| Epoxy resin | 100 |
| Monoglycidic ester of ethylene glycol | 9 |
| Liquid thiocol | 15 |
| Nickel powder | 40 |
| Hardening catalyst | 10 |

The cement film 1 is hardened within 3 hours at 70° C. The magnetic field induction is 500 gauss. In the course of the first two minutes of hardening the film is processed in a pulsating magnetic field with a frequency of 0.5 c.p.s. and having a maximum and a minimum of 1000 and 500 gauss, respectively.

In the device produced by this process, 100% of the Fernico conductors 5 have a reliable contact with the semiconductor 3 being at the same time insulated from the platinum grid 6. The insulation resistance between the adjacent Fernico conductors 5 is determined by the electric resistance of the semiconductor 3.

Figure 2:
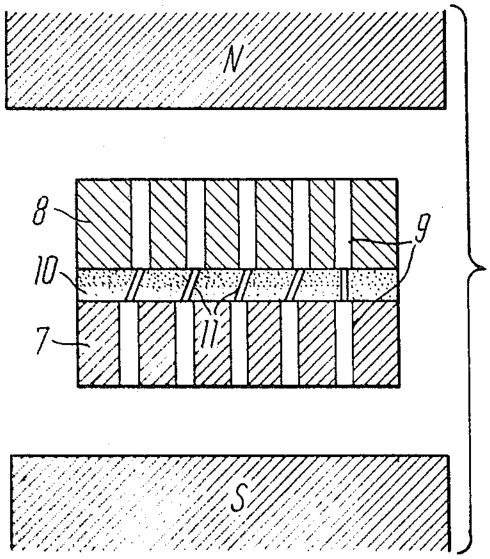
FIG. 2 illustrates diagrammatically the cement contact between two reinforced glass discs.

In FIG. 2 two reinforced glass discs 7 and 8 having 930 Fernico conductors 9 of 0.15 mm. diameter on an area of 1 cm.$^2$ are cemented together. The composition of the cement is the same as given above. The cement film 10 is hardened at 100° C. within 30 minutes.

The magnitude of induction and the magnetic field characteristics are the same as indicated above. After hardening of the cement film, the electric resistance of one microcontact formed by the beam of particles 11 ranges from 10 to 100 ohms. The insulation resistance between the adjacent Fernico conudctors exceeds $10^{10}$ ohms.

Figure 3:
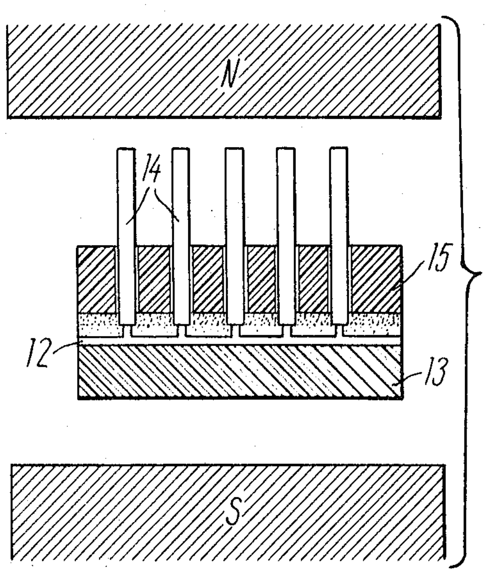
FIG. 3 illustrates diagrammatically the cement contact between conductors and a photosensitive layer.

As shown in FIG. 3, the Fernico or nickel conductors 14 are cemented to a photosensitive layer or to a luminophore layer 12 applied to a transparent current-conducting backing 13. Before cementing, conductors 14 are inserted into the previously made holes in a plate 15 made of photosytall or fluoroplastic. The number and arrangement of the holes in the plate should match the number and arrangement of the contacts.

In cementing brass parts, the cement should have the following composition, percent of FD–5 resin:

| | |
|---|---|
| Epoxy resin FD–5 | 100 |
| Monoglycidic ester of diethylene glycol | 7.5 |
| Hardening catalyst | 10 |
| Nickel powder. [1] | |

[1] For quantity see Table 1.

The contact resistance of the cemented joint is given in Table 1.

TABLE 1

| | Contact resistance of cemented joint, ohm. cm.$^2$ | |
|---|---|---|
| | Hardening outside of magnetic field | Hardening in magnetic field as described above |
| Nickel powder, percent: | | |
| 15 | 0.0024 | 0.000170 |
| 40 | 0.0020 | 0.000096 |
| 100 | 0.0015 | 0.000045 |
| 200 | 0.00079 | 0.000036 |

In cementing brass parts, the cement may have the following composition, percent of FD–5 resin:

| | |
|---|---|
| Epoxy resin FD–5 | 100 |
| Monoglycidic ester of ethylene glycol | 7.5 |
| Hardening catalyst | 10 |
| Nickel (percent of mixture, by volume) | 2.2 |
| Fine-powdered quartz sand. [1] | |

[1] For quantity see Table 2.

The cement film is hardened at 75° C. within 2 hours. The magnitude of magnetic field induction is 500 gauss. In the course of the first two minutes of hardening, the film is processed in a pulsating magnetic field with a frequency of 1 c.p.s. and a maximum and minimum of 1000 and 500 gauss, respectively.

The contact resistance of the cemented joint is given in Table 2.

TABLE 2

| | Contact resistance of cemented joint, ohm. cm.$^2$ | |
|---|---|---|
| | Hardening outside of magnetic field | Hardening in magnetic field |
| Fine-powdered quartz sand, percent: | | |
| 25 | 0.0049–0.059 | 0.00048–0.00078 |
| 50 | 0.5–>$10^6$ | 0.00072–0.0016 |
| 100 | >$10^5$ | 0.0080–0.015 |

The described method of producing an electric contact can be used in manufacturing both permanent and temporary electric contacts with a low contact resistance.

The described method allows simultaneous production of up to 10,000 electric contacts per 1 cm.$^2$.

In making devices with a low density of contacts, which can be produced by the use of a conventional current-conducting cement, the described method will step up productivity since all the contacts located in the same plane are made simultaneously.

In a number of cases the use of the described method allows costly silver to be replaced by a cheaper current-conducting filler.

What we claim is:

1. A method of producing an electrical contact between two cemented parts at least portions of which are electrically conductive, said method comprising applying a current-conducting cement between two parts to be joined together, said cement being constituted as a hardenable resin containing a filler of current-conducting ferromagnetic powder particles, and applying a non-uniform magnetic field having a variable intensity across the field section through said cement to form separated micro-contact regions between said parts in said cement while hardening the cement in situ.

2. A method as claimed in claim 1, wherein the application of the non-uniform magnetic field comprises initially subjecting the cement to a pulsating magnetic field having a frequency of 0.1 to 1000 c.p.s. with a static component of magnetic induction of 50 to 15,000 gausses and an amplitude of 10 to 5000 gausses.

3. A method as claimed in claim 2, wherein the non-uniform magnetic field is held static, after the application of the pulsating magnetic field, at a value of induction which is at least equal to the residual induction of the filler.

4. A method as claimed in claim 2, wherein said pulsating field is applied for about two minutes.

5. A method as claimed in claim 1, wherein said filler is nickel powder.

6. A method as claimed in claim 1, wherein said non-uniform magnetic field is produced by applying spaced areas of high magnetic intensity across the section of the field.

7. A method as claimed in claim 6, wherein said spaced areas are formed by insertion of conductors of ferromagnetic material in spaced relation in one of said parts along the length of the cement joint to be formed.

References Cited

UNITED STATES PATENTS

| | | | |
|---|---|---|---|
| 2,718,506 | 9/1955 | Elleman | 252—513 |
| 3,238,355 | 3/1966 | Van Eeck | 252—512 |
| 3,332,867 | 7/1967 | Miller et al. | 252—512 |
| 2,640,798 | 6/1953 | Langer | 156—275X |
| 2,721,925 | 10/1955 | Langer | 156—275X |
| 2,916,399 | 12/1959 | Kurz | 156—275X |
| 2,952,578 | 9/1960 | Carlson | 156—275X |
| 3,038,822 | 6/1962 | Currant et al. | 156—275X |
| 3,396,258 | 8/1968 | Leatherman | 156—272X |

BENJAMIN R. PADGETT, Primary Examiner

S. J. LECHERT, Jr., Assistant Examiner

U.S. Cl. X.R.

252—62.54, 62.55, 513; 148—105; 156—281, 330, 380